United States Patent [19]

Zmyslowski et al.

[11] Patent Number: 4,967,351
[45] Date of Patent: Oct. 30, 1990

[54] CENTRAL PROCESSOR ARCHITECTURE IMPLEMENTING DETERMINISTIC EARLY CONDITION CODE ANALYSIS USING DIGIT BASED, SUBTERM COMPUTATION AND SELECTIVE SUBTERM COMBINATION

[75] Inventors: Allan J. Zmyslowski; Pat Y. Hom, both of Sunnyvale, Calif.

[73] Assignee: Amdahl Corporation, Sunnyvale, Calif.

[21] Appl. No.: 920,515

[22] Filed: Oct. 17, 1986

[51] Int. Cl.⁵ .......................... G06F 9/28; G06F 7/02
[52] U.S. Cl. ...................................................... 364/200
[58] Field of Search ... 364/200 MS File, 900 MS File

[56] References Cited

U.S. PATENT DOCUMENTS

| | | | |
|---|---|---|---|
| 3,825,895 | 7/1974 | Larsen et al. | 364/200 |
| 3,881,173 | 4/1975 | Larsen et al. | 364/200 |
| 3,961,313 | 6/1976 | Bodner et al. | 364/200 |
| 4,200,927 | 4/1980 | Hughes et al. | 364/200 |
| 4,373,180 | 2/1983 | Linde | 364/200 |
| 4,578,750 | 3/1986 | Amdahl et al. | 364/200 |

Primary Examiner—Gareth D. Shaw
Assistant Examiner—John C. Loomis
Attorney, Agent, or Firm—Fliesler, Dubb, Meyer and Lovejoy

[57] ABSTRACT

A central processor architecture implementating a deterministic, digit based, subterm computation and selective subterm combination early condition code analysis mechanism to provide for the early determination of the condition code that will be returned upon normal execution of a condition code setting instruction is described. The early condition code is returned sufficiently early to be combined with a branch mask to substantially reduce if not eliminate the need to interlock an immediately following conditional branch instruction. A wide variety of condition code setting instructions are handled by the deterministic condition code analysis mechanism of the present invention by implementing the mechanism to determine condition codes by the generation of digit subterms of the operand data accompanying condition code setting instruction and then combining the digit subterms in a predetermined manner selected based on the specific condition code setting instruction being executed. Branch decision analysis is performed by inclusion of the branch decision mask as a subterm selectively combined with the condition code subterms.

5 Claims, 3 Drawing Sheets

CENTRAL PROCESSOR ARCHITECTURE IMPLEMENTING DETERMINISTIC EARLY CONDITION CODE ANALYSIS USING DIGIT BASED, SUBTERM COMPUTATION AND SELECTIVE SUBTERM COMBINATION

FIELD OF THE INVENTION

The present invention is generally related to pipe-lined central processor units typical of mainframe class computer systems and, in particular, to a pipe-lined instruction unit of a central processor that implements deterministic early condition code analysis to improve instruction processing throughput of the instruction unit.

BACKGROUND OF THE INVENTION

A principal factor in determining the throughput of a central processing unit is the effectiveness of its pipe-lined instruction unit in processing conditional instructions. Pipelined instruction units treat instructions as regular segmented entitie's to allow the staggered, overlapping processing of multiple instructions. In this manner, burst instruction processing speeds of up to one instruction per processor cycle can be achieved.

Conditional instructions that rely on the execution results of closely prior instructions present a special problem for pipe-lined instruction units. Conditional branch (BC) instructions, exemplary of conditional instructions in general, may implement an instruction sequence branch to a non-sequential next instruction address depending on the particular condition code returned by the execution of a prior condition code setting (CCS) instruction. Where a conditional branch instruction immediately follows and depends on the condition code returned by a condition code setting instruction, the conditional branch instruction is typically held, or interlocked, in the instruction unit pipeline until the condition code returned by the condition code setting instruction has become available. Only then can the conditional branch instruction correctly proceed. The interlock of the conditional branch instruction directly reduces the instruction processing throughput of the instruction unit and, therefore, the central processing unit as a whole.

In an attempt to avoid or reduce the throughput burden created by condition code interlocks, a number of techniques have been proposed and utilized with varying degrees of success. One technique proposed is to optimize the instruction unit specifically with regard to the execution of condition code setting instructions. The optimization reduces the instruction length of condition code setting instructions and thereby reduces the amount of time that a closely following conditional instruction is interlocked. To be effective, the shortened instructions require that the segmented pipeline of the instruction unit be similarly shortened. This, however, results in the instruction unit being poorly optimized for many of the more complex instructions with a corresponding degradation in the peak throughput of the central processing unit for a normal mix of processor instructions.

Another technique for optimizing the processing of condition code setting instructions is to implement a mechanism for predicting the condition code result early in the processing of the condition code setting instruction. An immediately following conditional branch instruction need only be interlocked, if at all, until the predicted condition code becomes available.

Unfortunately, a problem inherent with predictive condition code mechanisms is that the predicted condition code result will not always match that returned upon fully processing the condition code setting instruction. Where the predicted condition code is incorrect, the currently executing instructions must be aborted. Typically where the aborted instructions include a conditional branch instruction, the instruction unit pipeline must be emptied and restarted of the appropriate branch determined sequence of instructions.

The working assumption for predictive condition code mechanisms is that the processing throughput improvement obtained by correct condition code predicting outweighs the throughput penalty associated with incorrect condition code predictions. However, where the central processing unit is multiply executing substantially different programs, a statistics-based condition code predicting mechanism may be seriously in error in predicting condition codes for each program individually. The effective throughput for an ill-predicted program will be substantially poorer than the throughput level obtainable by simply accepting the full conditional instruction interlock penalty.

A better technique for improving the instruction unit processing of condition code setting instructions is to actually determine the eventual condition code result very early in the processing of the condition code setting instruction. Again, a closely following conditional instruction need be interlocked, if at all, only until the early determined condition code becomes available. An advantage is that the early condition code determining mechanism is fully deterministic and, therefore, completely avoids the throughput degradation potential associated with predicting condition codes.

Implementing a fully deterministic early condition code mechanism is, however, not without its disadvantages. The primary disadvantage is that it typically requires substantial instruction unit hardware support. There are a variety of distinctly different condition code setting instructions. Therefore, the hardware must support each separate type or instruction. Further, the early determined condition code must be determined very quickly to be at all useful and to fit within the processor cycle constraints of the instruction unit pipeline. The early condition code determining mechanism must receive the operand data associated with the condition code setting instruction to obtain a deterministic result. The transfer of anywhere from 16 to 64 bytes of operand data followed by operand analysis to determine the condition code, places severe, if not preclusive timing limitations on the instruction unit, substantially increases the amount of instruction unit hardware needed, and greatly reduces the number, variety and complexity of condition code setting instructions that can be handled by the early condition code determining mechanism. Additionally, conditional code setting instructions that are not handled by the early condition code determining mechanism are often simply and typically interlocked until the normal condition code is returned and set in the last cycle of the condition code setting instruction. Consequently, the net gain in processor throughput can be quite limited.

Therefore, there is a need for a central processing unit architecture that implements a deterministic, early condition code analysis mechanism to handle a wide variety of condition code setting instructions without resort to extensive hardware support and, further, that improves the processing throughput of non-early condition code setting instructions.

SUMMARY

This is achieved in the present invention by the implementation or a deterministic, early condition code analysis mechanism that provides for the early determination of the condition code that will be returned upon normal execution of certain condition code setting instruction The condition code is returned sufficiently early to be combined with a condition mask to substantially reduce if not eliminate the need to interlock an immediately following conditional instruction. A wide variety of condition code setting instructions are handled by the deterministic branch decision analysis mechanism of the present invention by the generation of digit subterms of the operand data accompanying condition code setting instructions and then combining the digit subterms in a predetermined manner selected based on the specific condition code setting instruction being executed.

Thus, an advantage of the present invention is that, while applicable to all conditional instructions, it permits deterministic branch decision analysis to be implemented with minimal additional hardware and to optimally reduce the time needed for the deterministic branch decision analysis mechanism to provide an early condition code based branch decision. The resulting easing of timing constraints allows handling more complex analysis of condition code setting instructions.

Another advantage of the present invention is that it places the deterministic branch decision analysis mechanism architecturally adjacent the operand word registers to further minimize early condition code timing constraints. Optimal use of the execution unit processing elements further reduces the amount of dedicated hardware. The architecture further provides for the distributed final validation generation of a control signal indicating whether or not conditional branch is taken to still further reduce the time required to provide a branch taken, condition code based result.

Another advantage of the present invention is that it allows for the expansion of the deterministic early condition code analysis mechanism to handle additional condition code setting instructions with minimal increase in complexity or amount of dedicated hardware required.

BRIEF DESCRIPTION OF THE DRAWINGS

These and other attendant advantages and further features of the present invention will become apparent and readily appreciated upon reference to the detailed description of the invention when considered in connection with the accompanying drawings, wherein like reference numerals designate like parts throughout the figures thereof, and wherein.

DETAILED DESCRIPTION OF THE INVENTION

Figure 1:
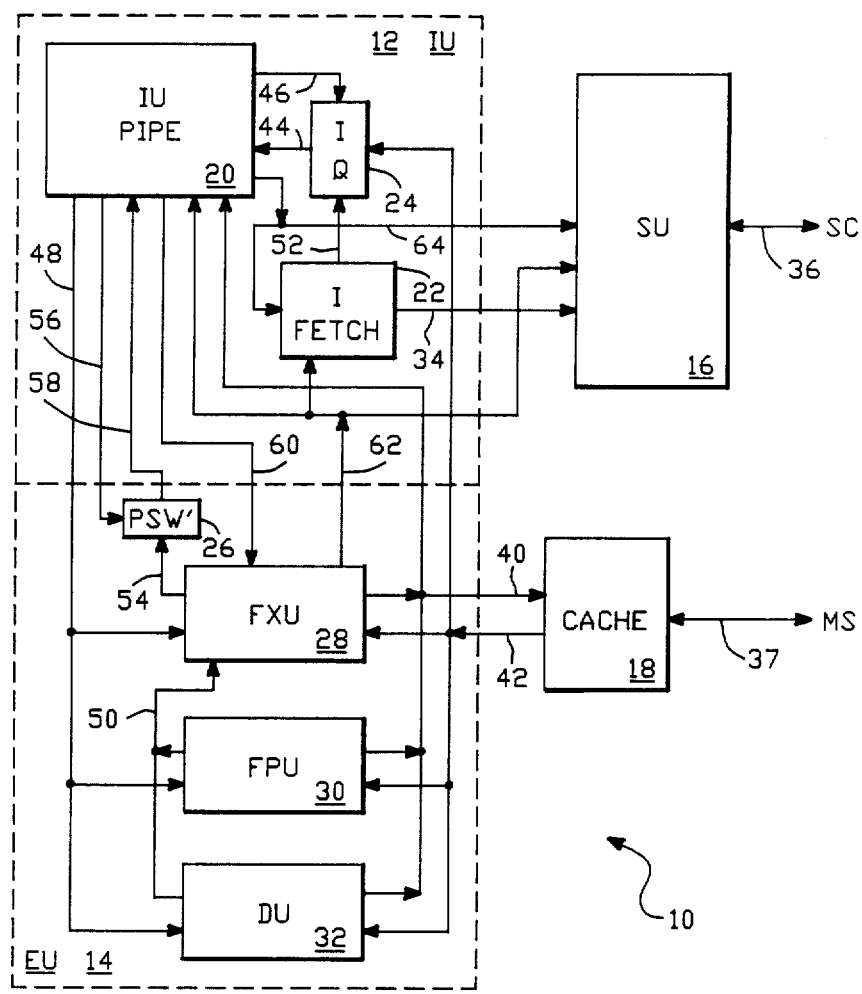
FIG. 1 is a simplified block diagram of a central processing unit constructed in accordance with a preferred embodiment of the present invention.

A central processor architecture (CPU), generally indicated by the reference numeral 10, is shown in FIG. 1. The CPU 10 includes an instruction unit (IU) 12, an execution unit (Eu) 14, a storage unit (SU) 16, and a cache memory 18. The instruction unit 12 includes, as its principal element, an instruction unit pipe 20 for executing instructions obtained from an instruction queue 24 via instruction bus 44. Instructions are transferred in response to a lead-pipe control signal provided by the instruction unit pipe 20 to the instruction queue 24 via control line 46. The instruction unit 12 also includes an instruction fetch machine (I-Fetch) 22 for prefetching instructions into the instruction queue 24. The writing of instructions into the instruction queue 24 is controlled by the instruction fetch machine 22 via control lines 52. The process of fetching an instruction is initiated by the instruction fetch machine 22 by placing a request via request lines 34 to the storage unit 16. Where the requested instruction is present in the cache memory 18, the storage unit 16 provides the necessary cache memory line select control signals via control lines 38 to the cache memory 18 to source the requested instruction onto the CPU-internal instruction/operand data bus 42 and, thereby, to, the input of the instruction queue 24. If the requested instruction is not present in the cache memory 18, request is placed by the storage unit 16 to a system controller (SC; not shown) via request lines 36 for a corresponding memory line to be provided generally from mainstore (not shown) via data bus 37.

In the preferred embodiment of the present invention, the instruction unit pipe 20 implements a five stage instruction execution pipeline. The five stages are decode (D), address (A), fetch operands from buffer cache (B), execute instruction (X), and write operand results to buffer cache (W). The instruction unit pipe 20 supports either one, for simple instructions, or multiple X-state processor cycles as necessary to support the execution unit 14 in executing more complex instructions. Accordingly, instruction pipeline interlocks are provided to delay the execution of subsequent pipelined instructions from entering their X-state cycle, typically in or prior to entering their B-state cycle, to prevent conflicts in the use of the X-state pipeline hardware.

The execution unit 14 includes a fixed point unit (FXU) 28, a floating point unit (FPU) 30 and a decimal unit (DU) 32. The architecture of the present invention provides for a portion of the processor status word register (PSW) to be located in the execution unit 14. A processor status word condition code (PSW'CC) register 26 receives any newly produced condition code via condition code lines 54 from the fixed point unit 28. These condition codes may either be produced by the fixed point unit 28 or just passed through from the floating point unit 30 or decimal unit 32 via the condition code lines 50. The instruction unit pipe 20 enables the setting of the PSW'CC register 26 via a W-state enable control signal on control line 56. The contents of the PSW'CC register 26 is, in turn, provided to the instruction unit pipe 20 via condition code reporting lines 58.

In accordance with the preferred embodiment of the present invention, a deterministic early condition code analysis mechanism specifically used for branch decision analysis is implemented as a component of the fixed point unit 28. This branch decision analysis mechanism operates in response to an instruction unit pipe command issued by the I-Unit via unit control lines 48. This command effectively selects the type of analysis to be performed based on the identity of the condition code setting instruction being executed. An override/unconditional branch control signal and a branch decision mask are also provided via control lines 60. In turn, the branch decision analysis mechanism of the fixed point unit 28 provides a branch decision control signal on control line 62. This branch decision control signal is provided not only to the instruction unit pipe 20, but to the instruction fetch machine 22 and storage unit 16. A branch validation control signal is produced by the instruction unit pipe 20 and provided to the instruction fetch machine 22 and storage unit 16, via control line 64, to validate the branch decision. Invalidation of the branch decision may occur for variety of conventional reasons, such as when the instruction unit pipe 20 becomes interlocked due to failure to obtain necessary operand data or where an invalidating error occurs somewhere in the central processor 10.

For purposes of the present invention, all condition codes setting instructions are categorized as either early condition code setting instructions or normal condition code setting instructions. Non-executing condition code setting instructions form a quasi-group of instructions that either directly adjust the contents of the PSW'CC register 26 or that, for whatever reason, fail to enter an X-state. More specifically, non-executing instructions are any instructions having a single no-operation (NOP) I-state processor cycle or that is in the execution unit 14.

The treatment of an early condition code setting instruction immediately followed by a conditional branch instruction is illustrated in Table I.

TABLE I

| Early Condition Code Setting Instructions (Conditional Branch Example) | | | | | | |
|---|---|---|---|---|---|---|
| ECCS | D | A | B | X | W | |
| BC |  | D | A | B | X | W |
| BC+1 |  |  | D | A | (abort on branch) | |
| Target |  |  |  |  | D | A | B |

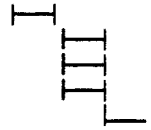

BDA(ECCA)
FX_UCC
SEL
PSW'_CC Enable
PSW'_CC Valid

A typical early condition code setting instruction is characterized by a single active X-state cycle. The instruction unit pipeline itself is characterized as implementing a one-processor cycle stagger for subsequent instructions. As illustrated in Table I, the early condition code setting instruction is immediately followed by a conditional branch instruction (BC) and sequential (non-branch) instruction (BC+1). The identity of the condition code setting instruction is determined upon the D-state cycle decoding of the instruction. The conditional branch instruction is decoded during the A-state cycle of the early condition code setting instruction and, thereby, provides its branch mask (a control field that selects a controlling condition for that particular conditional branch instruction). The operands of the early condition code setting instructions are addressed during its A-state cycle and, assuming availability from the cache memory 18, are fetched into the operand word registers of the execution unit 14 by the end of the B-state cycle. The branch decision analysis is, in turn, performed during the X-state of the early condition code setting instruction. That is, based on the operands fetched for the early condition code setting instruction, the identity of the condition code setting instruction as derived from the instruction decode cycle and the branch mask obtained from the instruction decode of the conditional branch instruction the deterministic condition code analysis mechanism of the present invention has all of the information necessary to determine not only, the condition code that will be returned by the normal execution of the early condition code setting instruction, but also to generate a singular branch decision control signal that specifies whether or not the branch is to be taken. Thus, at the conclusion of the early condition code setting instruction X-state cycle, the sequential instruction BC+1 can be aborted depending on the state of the branch decision signal. Where the branch decision control signal indicates that the branch is to be taken, the sequential instruction BC+1 can be aborted before entering its B-state cycle. Instead, the branch target address contained by the operands returned in the B-state cycle of the conditional branch instruction is used to fetch the target instruction for decoding during the W-state cycle of the early condition code setting instruction. Also during the W-state cycle of the early condition code setting instruction, the condition code returned by the early condition code setting instruction is produced and written into the PSW'CC register 26 and becomes valid for use by subsequent instructions. Conversely, where a conditional branch is not taken, the condition code value and the SSW'CC register 26 will be valid during the first X-state cycle of the sequential instruction BC+1.

In the above-described example, the condition code setting instruction penalty is completely eliminated regardless of whether the conditional branch is taken or not. The only degradation to the throughput of the CPU 10 is that imposed by taking the branch itself. This branch-taken penalty of two processor cycle occurs regardless of the present invention.

Table II illustrates the pipeline sequence flow following the execution of a normal condition code setting instruction.

TABLE II

| Normal Condition Code Setting Instructions (Conditional Branch Example) | | | | | | | | |
|---|---|---|---|---|---|---|---|---|
| NCCS | D | A | B | X | X | W | | |
| BC |  | D | A | A | A | B | X | W |
| BC+1 |  |  | D | D | D | A | (abort on branch) | |
| Target |  |  |  |  |  | D | A | B |

CCI Interlock
BDA(ECCA)
EUCC
SEL
PSW_CC Enable
PSW_CC Valid

A normal condition code setting instruction is characterized as requiring one or more X-state processor cycles and, further, requires a latch point to be established during the condition code analysis.

The identity of the normal condition code setting instruction is again obtained by the instruction decode during the D-state cycle of the normal condition code setting instruction. The branch mask is obtained in the following processor cycle from the instruction decode of the conditional branch instruction. Based on the identity of the normal condition code setting instruction, a condition code instruction interlock is placed on the pipeline execution of the conditional branch instruction beginning in the B-state cycle of the normal condition code setting instruction. That is, if multiple X-state cycles are required, the pipeline execution of the condition branch and subsequent instructions must be delayed. The conditional branch instruction is thus temporarily held in the beginning of its A-state cycle. That several condition code instruction interlock cycles are required is determined from the instruction decode of the normal condition code setting instruction. The instruction interlock is maintained until the execution unit 14 signals that it entering the last required X-state cycle.

In the example shown in Table II, the normal condition code setting instruction requires two X-state cycles. The conditional branch instruction is therefore interlocked for two processor cycles in its A-state. At the conclusion of the second X-state cycle of the normal condition code setting instruction, the early condition code analysis mechanism of the present invention has all of the necessary information to perform its deterministic condition code analysis. Thus during the W-state cycle of the normal condition code setting instruction (B-state cycle rf the conditional branch instruction), the branch decision analysis is performed. Since, as will be described in greater detail below, the analysis mechanism relies on the condition code result 'normally' returned by the floating point, fixed point or decimal units, the early condition code analysis occurs in the first processor cycle after the last X-state cycle of the normal condition code setting instruction.

Along with the early condition code analysis, the appropriate execution unit condition code will be selected for return and the PSW'CC register 26 will be enabled to receive the condition code. Consequently, depending on the branch decision control signal, the instruction unit 12 may abort the sequential instruction BC+1 and, utilizing the target address operand of the conditional branch instruction, will fetch and decode the target instruction during the X-state cycle of the conditional branch instruction. If the branch is not taken, the sequential instruction BC+1 continues to execute normally in the instruction unit pipeline.

As before, there is a two cycle branch taken penalty. Unlike early condition code setting instructions, a normal condition code setting instruction penalty equal to the number of X-state cycles required to generate the normal condition code is incurred. If, however, condition code analysis were not performed for a normal condition code setting instruction such as shown in Table II, the earliest the decode cycle of the conditional branch instruction could occur would be in the second processor cycle following the W-state cycle of the normal condition code setting instruction. This, there is at least a two processor cycle savings in the execution of every normal condition code setting instruction by virtue of the present invention.

Figure 2:
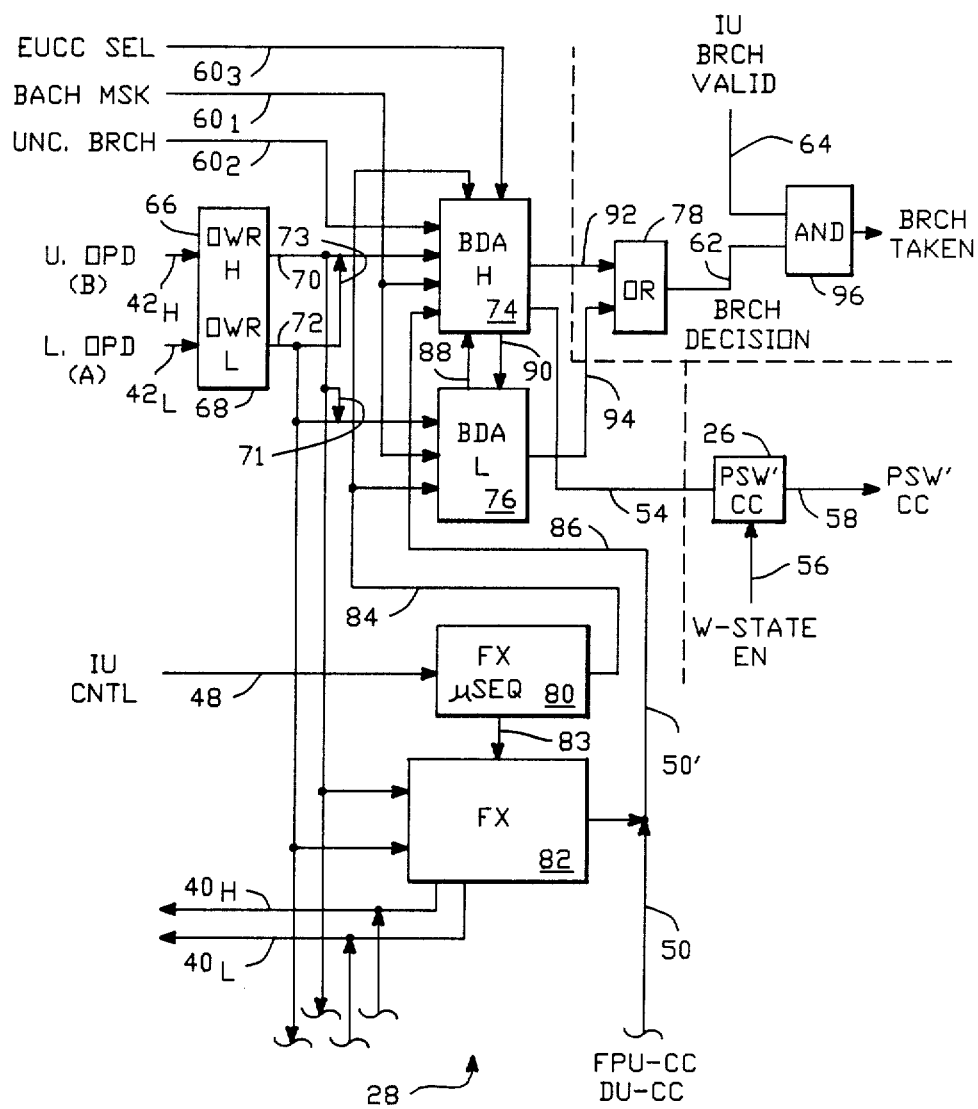
FIG. 2 is a block diagram of the deterministic branch decision analysis mechanism, constructed in accordance with a pre erred embodiment of the present invention.

Referring now to FIG. 2, the fixed point unit 28 effectively houses and provides control support of the early condition code analysis mechanism. Operand word registers (OWRH,WRL) 66, 68 receive the respective upper (OPB) and lower operand (OPA) words from the cache memory 18 via operand data lines 42H, 42L. In the preferred embodiment of the present invention, both operand word registers are 32 bits wide. Bits 0:11 and 16 (bit 0 being the most significant bit) of the upper operand are provided from the high operand word register 66 to a high branch decision analysis block 74 via high operand data lines 70, while bits 0 and 12:31 are provided to the low branch decision block 76 via high operand data lines 71. Similarly, bits 0:11 of the lower operand are provided to the high branch decision analysis block 74 while bits 0 and 12:31 of the lower operand are provided to a low branch decision analysis block 76 via operand data lines 72. The function of the high and low branch decision analysis block 74, 76 is to perform the digit based, subterm computation and selective combination to generate respective high and low branch terms. These high and low branch terms are respectively provided ia control lines 92, 94 to an OR control block 78 that, in turn, produces the branch decision control signal on control line 62. The high branch decision analysis block 74 is also the source of the execution unit condition code provided to the PSW'CC register 26 via the condition code input lines 54.

The fixed print unit 28 further includes a fixed point microsequencer 80 and the fixed point computation block 82. The fixed point microsequencer 80 receives an initial instruction unit microcode command during the A-state cycle via the command bus 48. Latched at the end of the A-state cycle, the microcode command is used during the B-state cycle to effectively specify the operative configuration of the fixed point computation unit 82 for the following X-state cycle. This operative configuration is set by one or more control-point setting control words sequentially provided by the fixed point microsequencer 80 via the control lines 83 in response to a single microcode command. Additional microcode commands may be issued for subsequent X-state cycles of the current instruction. The fixed point computation block 82 also receives the upper and lower operands via the operand data buses 70, 72 and, in turn, may provide new upper and lower operands onto the result operand data lines $40_H$, $40_L$. The fixed point computation block 82 further provides for the generation of a fixed point result condition code (FXCC) onto the execution unit condition code lines 50'.

In addition to the upper and lower operand words, the other inputs to the high and low branch decision analysis blocks 74, 76 include the branch mask control field from the branch mask control lines 601 and a set of control point configuration control signals from the fixed point micro-sequencer 80 via the analysis select control lines 84. The high branch decision analysis block 74 alone also receive the unconditional branch control signal via control line $60_2$ and the execution unit condition code via the condition code lines 50'.

The configuration of the high and low branch decision analysis blocks 74, 76 is, like the fixed point computation unit 2, specified by a control point control word selected in response to the current instruction unit microcode command as provided to the fixed point microsequencer 80. The specific microcode command provided by the instruction unit 12 is based on the decode of the condition code setting instruction being executed. The microcode command is interpreted by the fixed point microsequencer to specify a control point control word, for provision via configuration control lines 84, to the high and low branch decision analysis blocks 74, 76.

The high and low branch decision analysis blocks, when in an enabled configuration, as will be described in greater detail below, compute digit subterms of their respective partial operands. Computation of these digit subterms is independent of the particular early condition code setting instruction being executed. The configuration control word establishes the specific manner of combining these digit subterms to generate the respective high and low branch terms to be provided via the high and low branch term lines 92, 94. Digit subterms are exchanged between the high and low branch decision analysis blocks 74, 76 via the digit subterm lines 88, 90. The OR block 78 provides the logical OR of the high and low branch terms as the branch decision control signal on the branch decision control line 62. The branch decision control signal is then validated in the instruction unit pipe 20, instruction fetch machine 22, and storage unit 16 by the separate provision of an instruction unit branch valid control signal on control line 64. At each of these locations, an AND gate 96 is used to combine the instruction unit branch valid and branch decision control signals to produce the final branch taken control signal.

Figure 3:
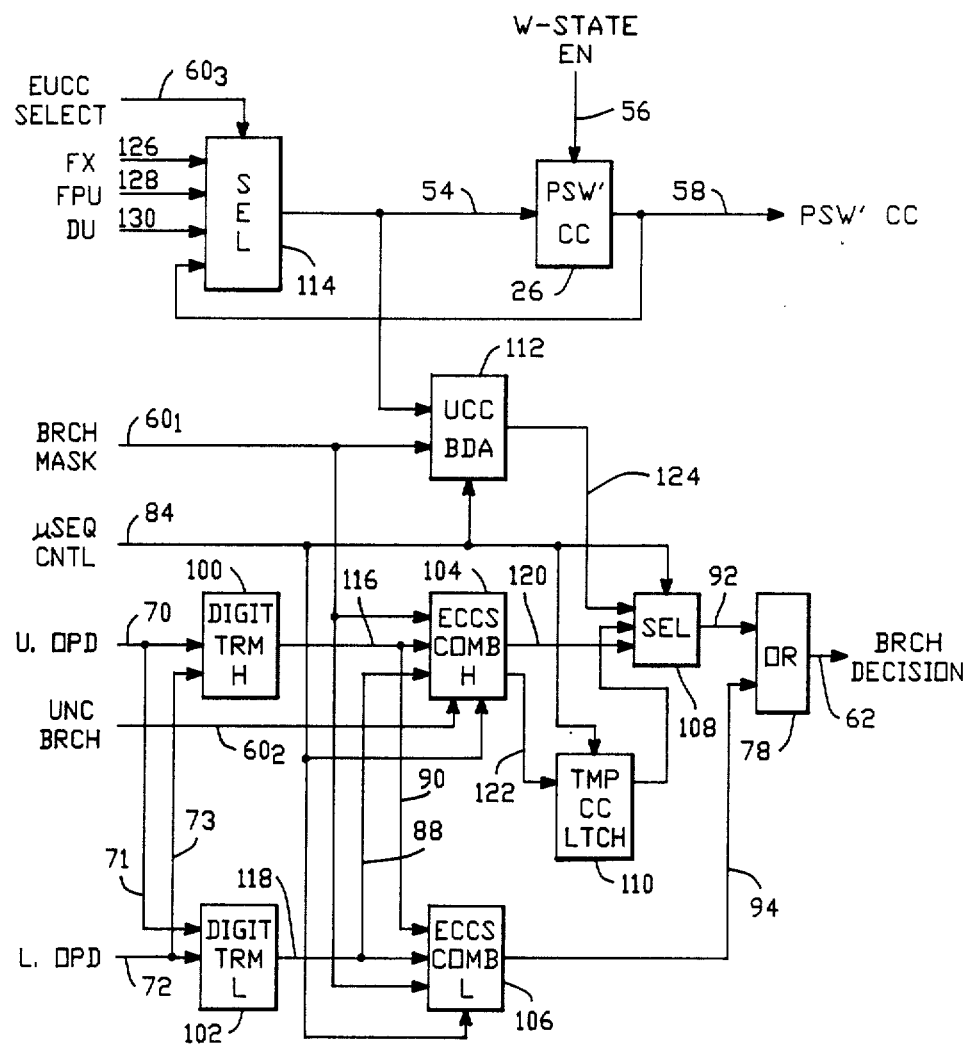
FIG. 3 is a detailed block diagram of the digit-based subterm computation and selective combination components of deterministic branch decision analysis mechanism constructed in accordance with a preferred embodiment of the present invention.

Referring now to FIG. 3, a detailed block diagram of the branch decision analysis blocks 74, 76 is shown. The principal elements of the high branch decision analysis block 74 include a high digit subterm computation block 100 (digits 0:2; each digit being 4 bits) subterm combination and the high ECCS analysis block 104. Similarly, the low branch decision block 76 includes a low digit subterm combination block 102 (digits 3:7) and low ECCS subterm combination block 106. As briefly described above, the high and low digit term computation blocks 100, 102 perform digit subterm computations based solely on their respective partial operands as received by the partial operand data lines 70, 71, 72, 73. Each of the subterm results the passed by the high and low digit term computation blocks 100, 102 to the high and low ECCS combination blocks 104, 106, by the subterm data lines 116, 118. Copies of certain high and low digit subterms are crossed via the cross subterm lines 88, 90 from the high and low digit term computation blocks 100, 102 to the low and high ECCS combination blocks 106, 104, respectively. The high and low ECCS combination blocks 104, 106 both receive the branch mask $60_1$ and the microsequencer control point control word via control lines 84. The high ECCS analysis block 104 further receives the unconditional branch control signal via control line $60_2$. Based on the microsequencer control point control word, the high and low ECCS combination blocks 104, 106 are specifically configured to combine the digit subterms that they respectively receive to produce branch terms on their branch term output lines 120, 94. The high branch term on line 120 is selectively passed by the selector 1-8 onto the high branch term line 92 for early condition code setting instructions. The effect of the unconditional branch control signal being provided onto the unconditional branch line $60_2$ is simply to force the result of the high ECC combinatio block 104 to a branch true state irregardless of the particular branch subterms that it receives.

The result produced by the combining of the digit subterms yields essentially the condition code value that will be returned upon normal completion of the condition code setting instruction. The branch mask takes the condition code analysis one step further by qualifying the condition code to produce a Boolean branch decision. In accorance with the present invention, the branch mask is utilized by both the high and low ECCS analysis blocks 104, 106 to separately qualify their condition code analysis. Thus, the resulting branch terms are simple Boolean control signals representing their condition code analysis qualified by the Boolean state of the specific condition being tested by the conditional branch instruction. For early condition codes setting instructions, the ECCS analysis qualified by the branch mask therefore ultimately yields the branch decision. There is, however, a positive requirement that the actual condition code be returned and set in the PSW'CC register 26. Although the branch decision control signal is generated and is in fact the basis for the branch decision, the early condition code setting instructions do return their normally generated condition code. Accordingly, selector 114 receives not only the fixed point condition code on lines 126, but also the floating point unit and decimal unit condition codes on respective lines 128, 130. The appropriate condition code input lines for the currently executing condition code setting instruction are selected in response to a unit condition code select signal provided from the instruction unit pipe 20. Thus, the single selected execution unit condition code (EUCC) is provided on the EUCC line 54 to the input of the PSW'CC register 26. Note that for non-condition code setting instructions, the current condition code value is typically cycled back through the selector 114 and reloaded into the PSW'CC register 26, thereby allowing the contents of the PSW'-C register 26 to be preserved.

Normal condition code setting instructions specifically differ from early condition code setting instructions in that they rely on the condition codes normally generated by the fixed point, floating points or decimal point units. Depending on the particular normal condition code setting instruction being executed, the EUCC select control signals from the instruction unit pipe 20 selects one of the selector inputs 126, 128, 130 to provide the corresponding normal condition code on the EUCC lines 54. An execution unit condition code branch decision analysis block 112, receiving both the EUCC from lines 54 and the branch mask from lines $60_1$ performs a branch qualification operation to qualify the normal condition code for the specific conditional branch being executed. The resulting normal branch term is provided to the selector 108 for selection and provision as the upper branch term on the branch term line 92. This selection by the selector 108 is made in response to the microsequencer control point control word. ECCS combination blocks 104, 106, also based on the microsequencer specified control configuration selected for normal condition code setting instructions are effectively disabled. Specifically, the low ECCS analysis block 106 is configured to always return a low or false branch term on the branch term control line 94. This allows the unit condition code branch decision analysis block 112 to effectively control the branch decision control signal generated and, in turn, placed on the branch decision control line 62. Finally, as with the early condition code setting instructions, the execution unit control code provided on the EUCC lines 54 is latched into the PSW'CC register 26 during the W-state of the normal condition code setting instruction.

In accordance with the present invention, a throughput problem associated with the execution of condition code setting instructions occurs with a special subgroup of early condition code setting instructions. There instructions include Branch-on-Index-High, Branch-on-Index-Low-Or-Equal and Branch-on-Count. The problem associated with these instructions is that they do not set a condition code in the PSW'CC register 26. Rather, these 'non-register'/early condition code setting instructions are executed in two instruction flows; the first flow appearing to be a simple early condition code setting instruction and the second flow operating as a conditional branch. The first flow is immediately followed by the associated conditional branch instruction flow so that a virtual condition code can be passed during the W-state cycle of the non-register early condition code setting instruction flow.

The ECCS analysis mechanism of the present invention provides for the generation of the branch decision control signal during the X-state of the non-register early condition code setting instruction flow. However, an interlook condition can occur with respect to the immediately following conditional branch instruction flow such that the second flow is interlocked in its A-state cycle for two or more cycles. Since the condition code result upon which it relied is not returned and set in the PSW'CC is typically register 26, the non-register condition code could be lost. Thus, both the conditional branch and the non-register early condition code setting instruction flows would have to be re-executed.

TABLE III

Condition Code Setting Instructions
(Non-Register Condition Code Example)

| | | | | | | | | |
|---|---|---|---|---|---|---|---|---|
| NR ECCS FLOW | D | A | B | X | W | | | |
| BC FLOW | | D | A | A | A | B | X | W |

BDA(ECCA) ⊢—⊣
Interlock ⊢—⊣
BD Held ⊢—⊣
FX_UCC ⊢—⊣

The present invention provides a non-register condition code latch. 110 to temporarily hold the non-register condition code result branch decision produced by the high ECCS subterm combination block 104. The non-register condition code latch 110 is enabled by a control point control signal produced by the fixed point microsequencer 80. The microcode command specifies the latching of the non-register condition code branch decision for all non-register early condition code instructions when they are executed. The non-register condition code branch decision is thus preserved in the eventuality of a pipeline interlock. As indicated in Table III, the high term equivalent to the branch decision is held from the end of the early condition code analysis through the first processor cycle following the interlock condition. Thus, the execution of the immediately following conditional branch instruction flow can proceed properly following and independent of its having been interlocked.

EARLY CONDITION CODE SETTING INSTRUCTION

Microcode Command Selection

The appropriate ECCS analysis is selected via a 4-bit Fixed-Point microcode field. The table below lists the microfield control values and the ECCS branch analysis selected.

TABLE IV

| Branch Cntl 0123 | Branch Test | *Branch Logic |
|---|---|---|
| 0000 | Compare Arithmetic Fullword | CC0,1,2 |
| 0001 | Compare Logical Fullword | CC0,1,2 |
| 0010 | Branch on Index High | high |
| 0011 | Compare Arithmetic Halfword | CC0,1,2 |
| 0100 | Branch Index Low or Equal | low,eql |
| 0101 | Exclusive Or | CC0,1 |
| 0110 | Test Under Mask | CC0,1,3 |
| 0111 | Or | CC0,1 |
| 1000 | And | CC0,1 |
| 1001 | Branch on Count | count<>1 |
| 1010 | Load and Test Register | CC0,1,2 |
| 1011 | Compare Logical Immediate | CC0,1,2 |
| 1100 | No Test | — |
| 1101 | Undefined | — |
| 1110 | Undefined | — |
| 1111 | Reset | — |

*For a given instruction, this column indicates which Condition Code CC0, CC1, CC2, CC3, enter the branch decision logic (The symbol "7" represents a logical NOT operator.)

TABLE V

Conditional Branch Decision Logic Instruction Mask

| Condition Code | Branch Mask 0 | 1 | 2 | 3 | Branch Decision |
|---|---|---|---|---|---|
| XXX | 0 | 0 | 0 | 0 | NO |
| CC3 | X | X | X | 0 | NO |
| CC3 | X | X | X | 1 | YES |
| CC2 | X | X | 0 | X | NO |
| CC2 | X | X | 1 | X | YES |
| CC1 | X | 0 | X | X | NO |
| CC1 | X | 1 | X | X | YES |
| CC0 | 0 | X | X | X | NO |
| CC0 | 1 | X | X | X | YES |
| XXX | 1 | 1 | 1 | 1 | YES |

High Digit Subterm Computation Equations

This section defines the equation used for generating the ECCS computation subterms in the high digit subterm computation block 100. These subterms are based on the two three-digit partial operands that this block receives (digits 0, 1 and 2 of Operands A and B).

OPA LTE OPB DIGIT0

This subterm detects if digit 0 of Operand A is less than or equal to Operand B. It is formed by taking the logical not of the equation for digit 0 of Operand A being greater than digit 0 of Operand B. Bit3 of the ECCS microfield select code (CTL<3>) selects whether a logical or an arithmetic compare is to take place on bit0 of the operands.

The equation for this subterm is given below:

```
OPA LTE OPB DIGIT0  =   (OPA GT OPB DIGIT0)
                    =   ( OPA<0> *  OPB<0> *  CTL<3> +
                        OPA<0> *  OPB<0> *  CTL<3> +
                        OPA<1> *  OPB<1> * OPA<0> =OPB<0> +
                        OPA<2> *  OPB<2> * OPA<0:1> =OPB<0:1> +
                        OPA<3> *  OPB<3> * OPA<0:2> =OPB<0:2> )
```

OPA GET OPB DIGIT0

This subterm detects if digit 0 of Operand A is greater than or equal to that of Operand B. It is formed by taking the logical not of the equation for digit 0 of Operand B being greater than digit 0 of Operand A. A modification to this basic equation Bit3 of the ECCS micro-

OPA GET OPB DIGIT1 and DIGIT2

These subterms detect if Operand A is greater than or equal to Operand B for digits positions one and two. They are formed by taking the logical not of the equation for Operand B being greater than Operand A for each digit position.

```
OPA GTE OPB DIGIT1  =   (OPA GT OPA DIGIT1)
                    =   ( OPA<4> *  OPB<4> +
                        OPA<5> *  OPB<5> * OPA<4> =OPB<4> +
                        OPA<6> *  OPB<6> * OPA<4:5> =OPB<4:5> +
                        OPA<7> *  OPB<7> * OPA<4:6> =OPB<4:6> )

OPA GTE OPB DIGIT2  =   (OPB GT OPA DIGIT2)
                    =   ( OPA<8> * OPB<8> +
                        OPA<9> * OPB<9> * OPA<8> =OPB<8> +
                        OPA<10> * OPB<10> * OPA<8:9> =OPB<8:9> +
                        OPA<11> * OPB<11> *
                        OPA<8:10> =OPB<8:10> )
``` field select code (CTL<3>) selects whether a logical or an arithmetic compare is to take place on bit0 of the operands.

DIGIT EQUALITY TERMS

These subterms detect if Operand A is equal to Oper-

```
OPA GTE OPB DIGIT0  =   (OPA GT OPA DIGIT0)
                    =   (OPA<0> *  OPB<0> *  CTL<3> +
                        OPA<0> *  OPB<0> *  CTL<3> +
                        OPA<1> *  OPB<1> * OPA<0> =OPB<0> +
                        OPA<2> *  OPB<2> * OPA<0:1> =OPB<0:1> +
                        OPA<3> *  OPB<3> * OPA<0:2> =OPB<0:2> )
```

OPA LTE OPB DIGI1 and DIGIT2

These subterms detect if Operand A is less than or equal to Operand B for digits positions one and two. They are formed by taking the logical not of the equation for Operand A being greater than Operand B for each digit position.

and B for various digit positions. The equations for these subterms are given below:

| | | |
|---|---|---|
| OPA EQ OPB DIGIT0 : | OPA<0:3> | = OPB<0:3> |
| OPA EQ OPB DIGIT1 : | OPA<4:7> | = OPB<4:7> |
| OPA EQ OPB DIGIT2 : | OPA<8:11> | = OPB<8:11> |
| OPA EQ OPB DIGIT0:1 : | OPA<0:7> | = OPB<0:7> |
| OPA EQ OPB DIGIT0:2 : | OPA<0:11> | = OPB<0:11> |

```
OPA LTE OPB DIGIT1  =   (OPA GT OPB DIGIT1)
                    =   (OPA<4> *  OPB<4> +
                        OPA<5> *  OPB<5> * OPA<4> =OPB<4> +
                        OPA<6> *  OPB<6> * OPA<4:5> =OPB<4:5> +
                        OPA<7> *  OPB<7> * OPA<4:6> =OPB<4:6> )

OPA LTE OPB DIGIT2  =   (OPA GT OPB DIGIT2)
                    =   (OPA<8> *  OPB<8> +
                        OPA<9> *  OPB<9> * OPA<8> =OPB<8> +
                        OPA<10> *  OPB<10> *
                        OPA<8:9> =OPB<8:9> + OPA<11> *
                        OPB<11> * OPA<8:10> =OPB<8:10> )
```

Note that the OPA EQ OPB DIGIT 0:2 subterm is one of the inter-digit subterms sent from the high subterm computation block 100 to the low ECCS selective combination block 106.

DIGIT LOGICAL AND TERMS

These subterms represent a logical 'AND' operation on various digit positions and whether the result is a logical zero. These subterms are formed by taking the logical not of the equation to detect a non-zero digit. The equations for these subterms are given below:

```
OPA_AND_OPB DIGIT0 EQ ZERO    =    (OPA_AND_OPB DIGIT0 NE ZERO)
                              =    (OPA<0> * OPB<0> +
                                   OPA<1> * OPB<1> +
                                   OPA<2> * OPB<2> +
                                   OPA<3> * OPB<3> ))

OPA_AND_OPB DIGIT1 EQ ZERO    =    (OPA_AND_OPB DIGIT0 NE ZERO)
                              =    (OPA<4> * OPB<4> +
                                   OPA<5> * OPB<5> +
                                   OPA<6> * OPB<6> +
                                   OPA<7> * OPB<7> )

OPA_AND_OPB DIGIT2 EQ ZERO    =    (OPA_AND_OPB DIGIT2 NE ZERO)
                              =    (OPA<8> * OPB<8> +
                                   OPA<9> * OPB<9> +
                                   OPA<10> * OPB<10> +
                                   OPA<11> * OPB<11> )

OPA_AND_OPB DIGIT0:2 EQ ZERO  =    OPA_AND_OPB DIGIT0 EQ ZERO *
                                   OPA_AND_OPB DIGIT1 EQ ZERO *
                                   OPA_AND_OPB DIGIT2 EQ ZERO
```

Note that the OPAANDOPB DIGIT0:2 EQ ZERO subterm is another one of the inter-digit subterms sent from the high subterm computation block 100 to the low ECCS selective combination block 106.

DIGIT MASK TERMS

These subterms detect if the digit value of Operand B is all ones (i.e., '1111') under a mask value provided by Operand A. These subterms are used exclusively for Test Under Mask (TM) instructions. The equations for these subterms are given below:

```
MASKED DIGIT0 EQ ONE    =    ( OPA<0> + OPB<0>) *
                             ( OPA<1> + OPB<1>) *
                             ( OPA<2> + OPB<2>) *
                             ( OPA<3> + OPB<3>)

MASKED DIGIT1 EQ ONE    =    ( OPA<4> + OPB<4>) *
                             ( OPA<5> + OPB<5>) *
                             ( OPA<6> + OPB<6>) *
                             ( OPA<7> + OPB<7>)
```

ONES DETECTION TERM

This subterm detects if all bits of digits 0 through 2 of Operand A are all ones ('1111 1111 1111'). This is an inter-digit subterm provided by the high subterm computation block 100 to the low ECCS selective combination block 106. The equation for this subterm is given below:

```
OPA DIGIT0:2 EQ ONE = OPA<0:11> = '1111 1111 1111'
```

ZERO DETECTION TERMS

These subterms detect if all bits of digits 0 through 2 of Operands A and B are all zeros ('0000 0000 0000'). These subterms are inter-digit subterms provided by the high subterm computtutation block 100 to the low ECCS selective combination block Ω. The equations for these subterms are given below:

```
OPA DIGIT0:2 EQ ZERO = OPA<0:11> = '0000 0000 0000'

OPB DIGIT0:2 EQ ZERO = OPB<0:11> = '0000 0000 0000'
```

Low diqit Subterm Computation Equations

This section defines the equations used for generating ECCS selective computation subterms in the low subterm computation block 102. These subterms are based on the two 5-digit partial operands that the low subterm computation block 102 receives.

OPA LTE OPB DIGIT3:7

These subterms detect if Operand A is less than or equal to Operand B for digit positions three through seven. They are formed by taking the logical not of the equation for Operand A being greater than Operand B for each digit position.

```
OPA LTE OPB DIGIT3  =   (OPA GT OPB DIGIT3)
                    =   (OPA<12> * OPB<12> +
                        OPA<13> * OPB<13> *
                        OPA<12> =OPB<12> +
                        OPA<14> * OPB<14> *
                        OPA<12:13> =OPB<12:13> +
                        OPA<15> * OPB<15> *
                        OPA<12:14> =OPB<12:14> )

OPA LTE OPB DIGIT4  =   (OPA GT OPB DIGIT4)
                    =   (OPA<16> * OPB<16> +
                        OPA<17> * OPB<17> *
                        OPA<16> =OPB<16> +
                        OPA<18> * OPB<18> *
                        OPA<16:17> =OPB<16:17> +
                        OPA<19> * OPB<19> *
                        OPA<16:18> =OPB<16:18> )

OPA LTE OPB DIGIT5  =   (OPA GT OPB DIGIT5)
                    =   (OPA<20> * OPB<20> +
                        OPA<21> * OPB<21> *
                        OPA<20> =OPB<20> +
                        OPA<22> * OPB<22> *
                        OPA<20:21> =OPB<20:21> +
                        OPA<23> * OPB<23> *
                        OPA<20:22> =OPB<20:22> )

OPA LTE OPB DIGIT6  =   (OPA GT OPB DIGIT6)
                    =   (OPA<24> * OPB<24> +
                        OPA<25> * OPB<25> *
                        OPA<24> =OPB<24> +
                        OPA<26> * OPB<26> *
                        OPA<24:25> =OPB<24:25> +
                        OPA<27> * OPB<27> *
                        OPA<24:26> =OPB<24:26> )

OPA LTE OPB DIGIT7  =   (OPA GT OPB DIGIT7)
                    =   (OPA<28> * OPB<28> +
                        OPA<29> * OPB<29> *
                        OPA<28> =OPB<28> +
                        OPA<30> * OPB<30> *
                        OPA<28:29> =OPB<28:29> +
                        OPA<31> * OPB<31> *
                        OPA<28:30> =OPB<28:30> )
```

OPA GET OPB DIGIT3:7

These subterms detect if Operand A is greater than or equal to Operand B for digit positions three through seven. They are formed by taking the logical not of the equation for Operand B being greater than Operand A for each digit position. The equations for these subterms are given below:

```
OPA GTE OPB DIGIT3 =    ( OPB GT OPA DIGIT3)
                   =    ( OPA<12> * OPB<12> +
                          OPA<13> * OPB<13> *
                          OPA<12> =OPB<12> +
                          OPA<14> * OPB<14> *
                          OPA<12:13> =OPB<12:13> +
                          OPA<15> * OPB<15> *
                          OPA<12:14> =OPB<12:14> )
```

OPA GTE OPB DIGIT4 =  ( OPB GT OPA DIGIT4)
= ( OPA<16> * OPB<16> +
OPA<17> * OPB<17> *
OPA<16> =OPB<16> +
OPA<18> * OPB<18> *
OPA<16:17> =OPB<16:17> +
OPA<19> * OPB<19> *
OPA<16:18> =OPB<16:18> )

OPA GTE OPB DIGIT5 =  ( OPB GT OPA DIGIT5)
= ( OPA<20> * OPB<20> +
OPA<21> * OPB<21> *
OPA<20> =OPB<20> +
OPA<22> * OPB<22> *
OPA<20:21> =OPB<20:21> +
OPA<23> * OPB<23> *
OPA<20:22> =OPB<20:22> )

OPA GTE OPB DIGIT6 =  ( OPB GT OPA DIGIT6)
= ( OPA<24> * OPB<24> +
OPA<25> * OPB<25> *
OPA<24> =OPB<24> +
OPA<26> * OPB<26> *
OPA<24:25> =OPB<24:25> +
OPA<27> * OPB<27> *
OPA<24:26> =OPB<24:26> )

OPA GTE OPB DIGIT7 =  ( OPB GT OPA DIGIT7)
= ( OPA<28> * OPB<28> +
OPA<29> * OPB<29> *
OPA<28> =OPB<28> +
OPA<30> * OPB<30> *
OPA<28:29> =OPB<28:29> +
OPA<31> * OPB<31> *
OPA<28:30> =OPB<28:30> )

DIGIT EQUALITY TERMS

These subterms detect if Operand A is equal to Operand B for digit positions four through seven. The equations for these subterms are given below:

| | |
|---|---|
| OPA EQ OPB DIGIT3 | : OPA<12:15> = OPB<12:15> |
| OPA EQ OPB DIGIT4 | : OPA<16:19> = OPB<16:19> |
| OPA EQ OPB DIGIT5 | : OPA<20:23> = OPB<20:23> |
| OPA EQ OPB DIGIT6 | : OPA<24:27> = OPB<24:27> |
| OPA EQ OPB DIGIT7 | : OPA<28:31> = OPB<28:31> |
| OPA EQ OPB DIGIT3:4 | : OPA<12:19> = OPB<12:19> |
| OPA EQ OPB DIGIT5:6 | : OPA<20:27> = OPB<20:27> |

-continued

| | |
|---|---|
| OPA EQ OPB DIGIT3:7 | : OPA EQ OPB DIGIT 3:4 *<br>OPA EQ OPB DIGIT 5:6 *<br>OPA EQ OPB DIGIT7 |

GROUP OPA GTE OPB TERMS

These subterms detect if Operand A is greater than or equal to Operand B over a group of digits. They are formed by taking the logical not of the equation for Operand A being less than Operand B over the digit range.

The equations for these subterms are given below:

OPA GTE OPB DIGIT3:7 = (OPA LT OPB DIGIT3:7 )
= (OPA LTE OPB DIGIT3 *  OPA EQ OPB DIGIT3
+
OPA LTE OPB DIGIT4 * OPA EQ OPB DIGIT3 *
OPA EQ OPB DIGIT4
+
OPA LTE OPB DIGIT5 * OPA EQ OPB DIGIT3 *
OPA EQ OPB DIGIT4 *  OPA EQ OPB DIGIT5
+
OPA LTE OPB DIGIT6 * OPA EQ OPB DIGIT3:4 *
OPA EQ OPB DIGIT5 *  OPA EQ OPB DIGIT6
+
OPA LTE OPB DIGIT7 * OPA EQ OPB DIGIT3:4 *
OPA EQ OPB DIGIT5:6 *  OPA EQ OPB DIGIT7)

```
OPA GTE OPB DIGIT4:7   =   (OPA LT OPB DIGIT4:7 )
                       =   (OPA LTE OPB DIGIT4 *   OPA EQ OPB DIGIT4
                                              +
                           OPA LTE OPB DIGIT5 * OPA EQ OPB DIGIT4
                           OPA EQ OPB DIGIT5
                                              +
                           OPA LTE OPB DIGIT6 * OPA EQ OPB DIGIT4 *
                           OPA EQ OPB DIGIT5 *  OPA EQ OPB DIGIT6
                                              +
                           OPA LTE OPB DIGIT7 * OPA EQ OPB DIGIT5:6 *
                           OPA EQ OPB DIGIT4 *  OPA EQ OPB DIGIT7
```

GROUP OPA LTE OPB TERMS

These subterms detect if Operand A is less than or equal to Operand B over a group of digits. They are formed by taking the logical not of the equation for Operand B being greater than Operand A over the digit range.

The equations for these subterms are given below:

DIGIT LOGICAL AND TERMS

These subterms perform a logical 'and' operation on the digit positions and detect if the result is a logical zero. These subterms are formed by taking the logical 'not' of the equation which detects a non-zero digit. The equations for these subterms are given below:

```
OPA LTE OPB DIGIT3:7   =   ( OPA GT OPB DIGIT3:7 )
                       =   (OPA GTE OPB DIGIT 3 *   OPA EQ OPB DIGIT3
                                              +
                           OPA GTE OPB DIGIT4 * OPA EQ OPB DIGIT3
                           OPA EQ OPB DIGIT4
                                              +
                           OPA GTE OPB DIGIT5 * OPA EQ OPB DIGIT3 *
                           OPA EQ OPB DIGIT4 *  OPA EQ OPB DIGIT5
                                              +
                           OPA GTE OPB DIGIT6 * OPA EQ OPB DIGIT3:4 *
                           OPA EQ OPB DIGIT5 *  OPA EQ OPB DIGIT6
                                              +
                           OPA GTE OPB DIGIT7 * OPA EQ OPB DIGIT3:4 *
                           OPA EQ OPB DIGIT5:6 *  OPA EQ OPB DIGIT7 )

OPA LTE OPB DIGIT4:7   =   ( OPA GT OPB DIGIT4:7 )
                       =   (OPA GTE OPB DIGIT4 *   OPA EQ OPB DIGIT4
                                              +
                           OPA GTE OPB DIGIT5 * OPA EQ OPB DIGIT4
                           OPA EQ OPB DIGIT5
                                              +
                           OPA GTE OPB DIGIT6 * OPA EQ OPB DIGIT4 *
                           OPA EQ OPB DIGIT5 *  OPA EQ OPB DIGIT6
                                              +
                           OPA GTE OPB DIGIT7 * OPA EQ OPB DIGIT5:6 *
                           OPA EQ OPB DIGIT4 *  OPA EQ OPB DIGIT7 )

OPA AND OPB DIGIT3 NEQ ZERO   =   OPA<12> * OPB<12> +
                                  OPA<13> * OPB<13> +
                                  OPA<14> * OPB<14> +
                                  OPA<15> * OPB<15>

OPA AND OPB DIGIT4 NEQ ZERO   =   OPA<16> * OPB<16> +
                                  OPA<17> * OPB<17> +
                                  OPA<18> * OPB<18> +
                                  OPA<19> * OPB<19>

OPA AND OPB DIGIT5 NEQ ZERO   =   OPA<20> * OPB<20> +
                                  OPA<21> * OPB<21> +
                                  OPA<22> * OPB<22> +
                                  OPA<23> * OPB<23>

OPA AND OPB DIGIT6 NEQ ZERO   =   OPA<24> * OPB<24> +
                                  OPA<25> * OPB<25> +
                                  OPA<26> * OPB<26> +
                                  OPA<27> * OPB<27>
```

```
OPA AND OPB DIGIT7 NEQ ZERO  =  OPA<28> * OPB<28> +
                                OPA<29> * OPB<29> +
                                OPA<30> * OPB<30> +
                                OPA<31> * OPB<31>

OPA AND OPB DIGIT3:7 EQ ZERO =  (OPA AND OPB DIGIT3:7 NEQ ZERO)
                             =  (OPA AND OPB DIGIT3 NEQ ZERO +
                                OPA AND OPB DIGIT4 NEQ ZERO +
                                OPA AND OPB DIGIT5 NEQ ZERO +
                                OPA AND OPB DIGIT6 NEQ ZERO +
                                OPA AND OPB DIGIT7 NEQ ZERO)
```

High and Low ECCS Subterm Combination Equations

This section describes the equations used for each selected type of ECCS analysis as implemented by the high and low ECCS selection subterm combination blocks 104, 106.

Compare Arithmetic/Logical Fullword

The Compare Arithmetic Fullword (CAF) analysis is performed on the Compare and Compare Register instructions. The Compare Logical Fullword (CLF) analysis is performed on the Compare Logical and Compare Logical Register instructions These instructions are defined to set the PSW'CC as shown below:

```
OP1 = OP2 : PSW'_CC = 0
OP1 < OP2 : PSW'_CC = 1
OP1 > OP2 : PSW'_CC = 2
```

The difference between the two analyses is whether an arithmetic (bit0 treated as a sign bit) or logical (bit0 treat d as a data bit) comparison is performed. This is controlled by bit3 of the ECCS select field (CTL<3>) in the OPA L E OPB DIGIT0 subterm.

The high ECCS selective subterm combination block 104 determines a branch decision for inequality conditions detected in the first three digits, while the inequality analysis for the remaining five digits, and the equality analysis, is performed on the low ECCS selective subterm combination block 106.

To select the 'less than' analysis the ECCS select field and branch mask are combined as follows:

```
CAF/CLF_CC1 = CTL<0:2>=000 * BRCH_MSK<1>
```

The branch decision for this condition can then be created on the high ECCS selective subterm combination block 104 as shown below:

```
BRHI_CAF/CLF_CC1 =  OPA LTE OPB DIGIT0 *  OPA EQ OPB DIGIT0 +
                    OPA LTE OPB DIGIT1 *  OPA EQ OPB DIGIT0 *
                    OPA EQ OPB DIGIT1 +
                    OPA LTE OPB DIGIT2 *  OPA EQ OPB DIGIT0:1 *
                    OPA EQ OPB DIGIT2
```

The branch term for this condition can then be created on the low ECCS selective subterm combination block 106 as shown below:

```
BRLO_CAF/CLF_CC1 = OPA EQ OPB DIGIT0:2 * OPA LTE OPB DIGIT3:7 *
                   OPA EQ OPB DIGIT3:7
```

To select the 'greater than' analysis the ECCS select field and branch mask are combined as follows:

```
CAF/CLF_CC2 : CTL<0:2>=000 * BRCH_MSK<2>
```

The high branch term for this condition can then be created on the high ECCS selective subterm combination block 104 as shown below:

```
BRHI_CAF/CLF_CC2 :  OPA GTE OPB DIGIT0 *  OPA EQ OPB DIGIT0 +
                    OPA GTE OPB DIGIT1 *  OPA EQ OPB DIGIT0 *
                    OPA EQ OPB DIGIT1 +
                    OPA GTE OPB DIGIT2 *  OPA EQ OPB DIGIT0:1 *
                    OPA EQ OPB DIGIT2
```

The low branch term for this condition can then be created the low ECCS selective subterm combination block as shown below:

```
BRLO_CAF/CLF_CC2 = OPA EQ OPB DIGIT0:2 * OPA GTE OPB DIGIT3:7 *
                   OPA EQ OPB DIGIT3:7
```

To select the equality analysis the ECCS select field and branch mask are combined as follows:

CAF/CLF_CC0 : CTL<0:2> =000 * BRCH_MSK<0>

The low branch term for this condition can then be created on the low ECCS selective subterm combination bock 106 as shown below:

BRLO_CAF/CLF_CC0 = OPA EQ OPB DIGIT0:2 * OPA EQ OPB DIGIT3:7

Branch on Index High

Branch on Index High (BXH) analysis is performed on the Branch on Index High instructions. For this instruction, one operand (Operand 3) specifies an increment and compare value. The increment value is added to another operand value (Operand 1) and the result is compared with the compare value. If the result of the addition is higher than the compare value a branch occurs; otherwise normal instruction sequence processing continues. Note that this instruction is one that does not set a PSW'CC condition code.

Since the branch decision for BXH instructions depends solely on the result of the BXH instruction, the select control which chooses the BXH analysis is based only on the 4-bit ECCS select field (CTL=0:3> ='0010'). The analysis for this instruction is performed by arranging to have the result of the addition available as Operand B and the compare value available as Operand A. A high branch term can then be determined on the high ECCS selective subterm combination block as shown in the equation below:

Compare Arithmetic Halfword

The Compare Arithmetic Halfword (CH) analysis is performed on the Compare Halfword instructions. This instruction is defined to set the PSW'CC as shown below:

| |
|---|
| OP1 = OP2 : PSW_CC = 0 |
| OP1 < OP2 : PSW_CC = 1 |
| OP1 > OP2 : PSW_CC = 2 |

In this instruction Operand A is treated as a 32-bit signed number while Operand B is treated as a 16-bit signed binary number. The sign bit of Operand B is extended for comparison to the 32-bit Operand A.

For CH instructions the high ECCS selective subterm combination block 104 determines a branch decision for inequality conditions detected in the first three digits, while the inequality analysis for the remaining five digits, and the quality analysis, is performed on the low ECCS selective subterm combination block.

To select the 'less than ' analysis the ECCS select field and branch mask are combined as follows:

CH_CC1 : CTL<0:3> =0011 * BRCH_MSK<1>

BRHI_BXH : OPA LTE OPB DIGIT0 * OPA EQ OPB DIGIT0
+
OPA LTE OPB DIGIT1 * OPA EQ OPB DIGIT0 *
OPA EQ OPB DIGIT1
+
OPA LTE OPB DIGIT2 * OPA EQ OPB DIGIT0:1 *
OPA EQ OPB DIGIT2

A low branch term can be determined on the low ECCS selective subterm combination block 106 as shown in the equation below The high branch term for this condition can then be created on the high ECCS selective subterm combination block 104 as shown below:

BRHI_CH_CC1 : (OPA<0> * OPB<16>)
+
(OPA<0> * OPA<1:11> ='111 1111 1111')

BRLO_BXH : OPA EQ OPB DIGIT0:2 * OPA LTE OPB DIGIT3:7 *
OPA EQ OPB DIGIT3:7

The low branch term for this condition can then be created on the low ECCS selective subterm combination block 106 as shown below:

```
BRLO_CH_CC1 :    OPA<0> *  OPA<12:15> = '1111'
                    +
                 OPA DIGIT0:2 EQ ZERO * OPA<12:15> = '0000' *
                 OPB<16> * OPA LTE OPB DIGIT4:7 *
                 OPA EQ OPB DIGIT4:7
                    +
                 OPA DIGIT0:2 EQ ONE * OPA<12:15> = '1111' *
                 OPB<16> * OPA LTE OPB DIGIT4:7 *
                 OPA EQ OPB DIGIT4:7
```

To select the 'greater than' analysis the ECCS select field and branch mask are combined as follows:

CH_CC2 = CTL<0:3> = 0011 * BRCH_MSK<2>

The high branch term can then be created on the high ECCS selective subterm combination block 04 as shown below:

```
BRHI_CH_CC2 =   OPA<0> * OPB<16>
                   +
                OPA<0> * OPA<1:11> = '000 0000 0000'
```

The low branch term for this condition can then be created on the low ECCS selective subterm combination block 106 as shown below:

```
BRLO_CH_CC2 =   OPA<0> *  OPA<12:15> = '0000' +
                OPA DIGIT0:2 EQ ZERO * OPA<12:15> = '0000' *
                OPB<16> * OPA GTE OPB DIGIT4:7 *
                OPA EQ OPB DIGIT4:7
                   +
                OPA DIGIT0:2 EQ ONE * OPA<12:15> = '1111' *
                OPB<16> * OPA GTE OPB DIGIT4:7 *
                OPA EQ OPB DIGIT4:7
```

To select the equality analysis the ECCS select field and branch mask are combined as follows:

CH_CC2 = CTL<0:3> = 0011 * BRCH_MSK<0>

The low branch term for this condition can then be created on the low ECCS selective subterm combination block 106 as shown below:

Branch on Index Low or Equal

The branch on Index Low or Equal (BXLE) analysis is performed on the Branch on Index Low or Equal instructions. For this instruction, one operand, (Operand 3) specifies an increment and compare value. The increment value is added to another operand value (Operand 1) and the result is compared with the compare value. If the result of the addition is lower than or equal to the compare value a branch occurs; otherwise normal instruction sequence processing continues. Note that this non-register instruction does not set a PSW'CC condition code.

Since the branch decision for BXLE instructions depends solely on the result of the BXLE instruction, the select control which chooses the BXLE analysis is based only on the 4-bit select field (CTL<0:3> = '0100'). The analysis for this instruction is performed by arranging to have the result of the addition available as Operand B and the compare value available as Operand A. A high branch term can then be determined in the ECCS selective subterm combination block 104 as shown in the equation below.

```
BRLO_CH_CC0 :   OPA EQ OPB DIGIT4:7 * OPA DIGIT0:2 EQ ONE *
                OPA<12:15> = '1111' * OPB<16>
                   +
                OPA EQ OPB DIGIT4:7 * OPA DIGIT0:2 EQ ZERO *
                OPA<12:15> = '0000' * OPB<16>
```

```
BRHI_BXLE  =    OPA GTE OPB DIGIT0 * OPA EQ OPB DIGIT0
                +
                OPA GTE OPB DIGIT1 * OPA EQ OPB DIGIT0 *
                OPA EQ OPB DIGIT1
                +
                OPA GTE OPB DIGIT2 * OPA EQ OPB DIGIT0:1 *
                OPA EQ OPB DIGIT2
```

A low branch term can be determined on the low ECCS selective subterm combination block 106 a shown in the equation below.

```
BRLO_BXLE  =    OPA EQ OPB DIGIT0:2 * OPA EQ OPB DIGIT3:7
                +
                OPA EQ OPB DIGIT0:2 * OPA GTE OPB DIGIT3:7 *
                OPA EQ OPB DIGIT3:7
```

While the above equation may be simplified, it is implemented in this manner so that the low branch term may be realized using only the ECCS subterms defined earlier.

This instruction, like BXH, has the additional feature of having to retain the results of the high branch term analysis in the temporary condition code latch 110 under certain conditions, i.e., interlock.

Exclusive OR

The exclusive-Or (XOR) analysis is performed on Exclusive Or (X), Exclusive Or Register (XR), and Exclusive Or Immediate (XI) instructions. THese instructions are defined to set the PSW'CC as shown below:

| Result is Zero | :PSW'_CC = 0 |
| --- | --- |
| Result is Non-Zero | :PSW'_CC = 1 |

The high ECCS selective subterm combination block 104 determines a high branch term for the 'non-zero' conditions detected in the first three digits, while the 'non-zero' analysis for the remaining five digits, and the 'zero' analysis, is performed on the low ECCS selective subterm combination block 106.

To select the 'non-zero' analysis, the ECCS select field and branch mask are combined as follows:

$$XOR\_CC1 = CTL<0:3> = 0101 * BRCH\_MSK<1>$$

The high branch decision for this condition can them be created on the high ECCS selective subterm combination block 104 as shown below:

```
BRHI_XOR_CC1 =  OPA LTE OPB DIGIT0 * OPA EQ OPB DIGIT0
                +
                OPA LTE OPB DIGIT1 * OPA EQ OPB DIGIT0 *
                OPA EQ OPB DIGIT1
                +
                OPA LTE OPB DIGIT2 * OPA EQ OPB DIGIT0:1 *
                OPA EQ OPB DIGIT2
                +
                OPA GTE OPB DIGIT0 * OPA EQ OPB DIGIT0
                +
                OPA GTE OPB DIGIT1 * OPA EQ OPB DIGIT0 *
                OPA EQ OPB DIGIT1
                +
                OPA GTE OPB DIGIT2 * OPA EQ OPB DIGIT0:1 *
                OPA EQ OPB DIGIT2
```

Again, the above equation may be simplified. However, the equation is implemented in this manner so that the high branch term may be done using only the ECCS subterm terms outlined earlier.

The branch decision for this condition can them be created on the low ECCS selective subterm combination block 106 as shown below:

$$BRLO\_XOR\_CC1 = OPA\ EQ\ OPB\ DIGIT3:7$$

To select the 'zero' analysis the ECCS select field and branch mask are combined as follows:

$$XOR\_CC0 = CTL<0:3> = 0101 * BRCH\_MSK<0>$$

The low branch term for this condition can then be created on the low ECCS selective subterm combination block 106 as shown below:

BRLO_XOR_CC0 = OPA EQ OPB DIGIT0:2 * OPA EQ OPB DIGIT3:7

Test Under Mask

The Test Under Mask (TM) analysis is performed on the Test Under Mask (TM) instruction. This instruction is defined to set the PSW'CC as shown below:

| Selected Bits 0 | : | PSW'_CC = 0 |
| Selected Bits 0:1 | : | PSW'_CC = 1 |
| Selected Bits 1 | : | PSW'_CC = 3 |

For these instructions the high ECCS selective subterm combination block determines the branch decision for all three conditions. OP2, the mask value, appears as Operand A while OP1, the storage value to be masked and tested, appears as Operand B.

To select the PSW'CC = O analysis, the ECCS select field and branch mask are combined as follows:

TM_CC0 = CTL<0:3>=0110 * BRCH_MSK<0>

The high branch term for this condition can then be created on the high ECCS selective subterm combination block 104 as shown below:

BRHI_TM_CC0 =
    OPA_AND_OPB DIGIT0 EQ ZERO *
    OPA_AND_OPB DIGIT1 EQ ZERO

To select the PSW'CC=1 analysis, the ECCS select field and branch mask are combined as follows;

TM_CC1 = CTL<0:3>=0110 * BRCH_MSK<1>

The high branch term for this condition can then be created on the high ECCS selective subterm combination block 104 as shown below:

BRHI_TM_CC1 = ( MASKED DIGIT0 EQ ONE +
    MASKED DIGIT1 EQ ONE) *
    ( OPA_AND_OPB DIGIT0 EQ ZERO +
    OPA_AND_OPB DIGIT1 EQ ZERO)

To select the PSW'CC=3 analysis the ECCS select field and branch mask are combined as follows:

TM_CC3 = CTL<0:3>=0110 * BRCH_MSK<3>

The high branch decision for this condition can then be created on the high ECCS selective subterm combination block 104 as shown below:

BHRI_TM_CC3 = MASKED DIGIT0 EQ ONE *
    MASKED DIGIT1 EQ ONE *
    OPA<0:7>='0000 0000'

OR

The Or (OR) analysis is performed on the IBM Or (O), Or Register (OR), and Or Immediate (OI) instructions. These instructions are defined to set the PSW'CC as shown below:

| Result is Zero | : | PSW'_CC = 0 |
| Result is Not-Zero | : | PSW'_CC = 1 |

The analysis is performed entirely on the low ECCS selective subterm combination block 106.

The analysis is performed entirely on the low ECCS selective subterm combination block 106.

To select the 'non-zero' analysis the ECCS select field and branch mask are combined as follows:

OR_CC1 = CTL<0:3>=0101 * BRCH_MSK<1>

The low branch term for this condition can then be created on the low ECCS selective subterm combination block 106 as shown below:

BRLO_OR_CC1 = (OPA DIGIT0:2 EQ ZERO *
    OPB DIGIT0:2 EQ ZERO *
    OPA_AND_OPB DIGIT3:7 EQ ZERO)
BRLO_OR_CC1 =

To select the 'zero' analysis, the ECCS select field and branch mask are combined as follows:

OR_CC0 = CTL<0:3>=0101 * BRCH_MSK<0>

The low branch term for this condition can then be created on the low ECCS selective subterm combination block 106 as shown below:

BRLO_OR_CC0 = OPA DIGIT0:2 EQ ZERO *
    OPB DIGIT0:2 EQ ZERO *
    OPA_AND_OPB DIGIT3:7 EQ ZERO

And

The And (AND) analysis is performed on the And (N), And Register (NR), and AND Immediate (NI) instructions. These instructions are defined to set the PSW'CC as shown below:

| Result is Zero | : | PSW'_CC = 0 |
| Result is Not-Zero | : | PSW'_CC = 1 |

The high ECCS selective subterm combination block 104 determines a branch decision for the 'non-zero' conditions detected in the first three digits, while the 'non-zero' analysis for the remaining five digits, and the 'zero' analysis, is performed on the low ECCS selective subterm combination block 106.

To select the 'non-zero' analysis, the ECCS select field and branch mask are combined as follows:

AND_CC1 = CTL<0:3>=1000 * BRCH_MSK<1>

The high branch decision for this condition can then be created on the high ECCS selective subterm combination block 104 as shown below:

BRHI_AND_CC1 =   OPA AND OPB DIGIT0 EQ ZERO +
                 OPA AND OPB DIGIT1 EQ ZERO +
                 OPA AND OPB DIGIT2 EQ ZERO

The low branch decision for this condition can then be created on the low ECCS selective subterm combination block 106 as shown below:

BRLO_AND_CC1 =   OPA AND OPB DIGIT3:7 EQ ZERO

To select the 'zero' analysis, the ECCS select field and branch mask are combined as follows:

AND_CC0 : CTL<0:3> = 1000 * BRCH_MSK<0>

The low branch term for this condition can then be created on the low ECCS selective subterm combination block 106 as shown below:

BRLO_AND_CC0 =   OPA AND OPB DIGIT0:2 EQ ZERO *
                 OPA_AND_OPB DIGIT3:7 EQ ZERO

Branch on Count

The Branch on Count (BCT) analysis is performed on Branch on Count (BCT) and Branch on Count Register (BCTR) instructions. For these instructions, Operand B specifies a value that will be decremented. If the result of the subtraction is non-zero a branch occurs; otherwise normal instruction sequence processing continues. Note that this instruction does not set a PSW'CC condition code.

Since the branch decision in this case depends solely on the result of the BCT or BCTR instruction, the select control which chooses the BCT analysis is based only on the 4-bit select field (CTL<0:3> = '1001'). The analysis for this instruction is performed entirely on the low ECCS selective subterm combination block 106 as shown below:

BRLO_BCT :   ( OPB DIGIT0:2 EQ ZERO *
              OPB<12:30> = '0' * OPB<31> )

This instruction, like BXH, has the additional feature of having to retain the results of the branch decision analysis in the temporary condition code latch under certain conditions, i.e. interlock.

Load and Test Register

The load and Test Register (LTR) analysis is performed on the Load and Test Register (LTR) instructions and the Load and Test Register System from User (LTRSU) and Load and Test Register User from System (LTRUS) instructions. These instructions are defined to set the PSW'CC as shown below:

| Result is Zero | : | PSW'_CC = 0 |
| Result is Less Than Zero | : | PSW'_CC = 1 |
| Result is Greater Than Zero | : | PSW'_CC = 2 |

In these instructions Operand B contains the new register value. The high ECCS selective subterm combination block 104 determines a high branch term for the less than zero condition, while the low ECCS selective subterm combination block 106 performs the zero and greater-than-zero analysis.

To select the less-than zero analysis the ECCS select field and branch mask are combined as follows:

LTR_CC1 = CTL<0:3> = 1010 * BRCH_MSK<1>

The high branch decision for this condition can then be created on the high ECCS selective subterm combination block 104 as shown below:

BRHI_LTR_CC1 = OPB<0>

To select the zero analysis, the ECCS select field and branch mask are combined as follows:

LTR_CC0 = CTL<0:3> = 1010 * BRCH_MSK<0>

The low branch term for this condition can then be created on the low ECCS selective subterm combination block 106 as shown below:

BRLO_LTR_CC0 =   OPB DIGIT0:2 EQ ZERO *
                 OPB DIGIT3:7 EQ ZERO

To select the greater-than zero analysis, the ECCS select field and branch mask are combined as follows:

LTR_CC2 = CTL<0:3> = 1010 * BRCH_MSK<2>

The low branch term for this condition can then be created on the low ECCS selective subterm combination block 104 as shown below:

BRLO_LTR_CC2 =   (OPB DIGIT 0:2 EQ ZERO *
                  OPB DIGIT3:7 EQ ZERO) * OPB <0>

Compare Logical Immediate

The Compare Logical Immediate (CLI) analysis is performed on the Compare Logical Immediate (CLI) instructions. This instruction is defined to set the PSW'CC as shown below:

| Operands Equal | : | PSW'_CC = 0 |
| Operand 1 is Low | : | PSW'_CC = 1 |
| Operand 1 is High | : | PSW'_CC = 2 |

In this instruction Operand A contains the one byte immediate field value appended with zeroes, while Operand B contains 1 byte of storage data, appended with zeroes. The high ECCS selective subterm combination block 104 determines the high branch term for the inequality conditions, while the low ECCS selective subterm combination block 106 performs the analysis for the equality condition.

To select the 'OP1 low' analysis, the ECCS select field and branch mask are combined as follows:

CLI_CC1 = CTL<0:3> = 1011 * BRCH_MSK<1>

The high branch term for this condition can then be created on the high ECCS selective subterm combination block 104 as shown below:

BRHI_CLI_CC1 =  OPA GTE OPB DIGIT0 * OPA EQ OPB DIGIT0
+
OPA GTE OPB DIGIT1 * OPA EQ OPB DIGIT0 *
OPA EQ OPB DIGIT1
+
OPA GTE OPB DIGIT2 * OPA EQ OPB DIGIT0:1 *
OPA EQ OPB DIGIT2

Note that the equation above may be simplified. However, it is implemented in this manner so that the analysis may be done using only the ECCS subterms defined above.

To select the 'OPI high' analysis, the ECCS select field and branch mask are combined as follows:

CLI_CC2 = CTL<0:3> = 1011 * BRCH_MSK<2>

The high branch term for this condition can then be created on the high ECCS selective subterm combination block 104 as shown below:

BRHI_CLI_CC2 =  OPA LTE OPB DIGIT0 * OPA EQ OPB DIGIT0
+
OPA LTE OPB DIGIT1 * OPA EQ OPB DIGIT0 *
OPA EQ OPB DIGIT1
+
OPA LTE OPB DIGIT2 * OPA EQ OPB DIGIT0:1
OPA EQ OPB DIGIT2

Again, the above equation may be simplified but is implemented as shown to make use of only the subterms described above.

To select the 'equality' analysis the ECCS select field and branch mask are combined as follows:

CLI_CC0 = CTL<0:3> = 1011 * BRCH_MSK<0>

The low branch term for this condition can then be created on the low ECCS selective subterm combination block 106 as shown below.

BRLO_CLI_CC0 =  OPA EQ OPB DIGIT0:2
* OPA EQ OPB DIGIT3:7

Normal Condition Code Setting Instructions

The I-Unit provides two-bit control code reflecting which condition code (FP, DU, FX, or PSW) should be selected for normal branch decision analysis. The table below gives the code value and the selected condition code.

TABLE VI

| Code | CC Selected |
|------|-------------|
| 00   | PSW'        |
| 01   | FX          |
| 10   | FPU         |
| 11   | DU          |

This code is generated by the I-unit based on the which unit processed the condition code setting (CCS) instruction currently in its W-state. If no CCS instruction is in W-state, the I-unit will select the PSWCC. Note that CCS instructions in earlier states of the pipeline (e.g., B or X) do not factor into this code. Instructions in these states are handled via the condition code interlock mentioned earlier.

Give these control signals, the execution unit condition code branch decision analysis Condition Code (IUCC) which may be used in the branch decision analysis. The equations for this condition code are given below:

IUCC<0> = PSW'_CC<0> * CODE <0:1> = '00' + FX_CC<0> *
CODE <0:1> = '01' + FP_CC<0> *
CODE <0:1> = '10' + DU_CC<0> *
CODE <0:1> = '11'

IUCC<1> = PSW'_CC<1> * CODE <0:1> = '00' + FX_CC<1> *
CODE <0:1> = '01' + FP_CC<1> *
CODE <0:1> = '10' + DU_CC<1> *
CODE <0:1> = '11'

The unit condition code analysis portion of the branch decision circuitry uses the I-unit selected condition code, the branch mask, and the lack of an ECCS select code, to arrive at a branch decision. The equations governing this condition are shown below:

BRHI_IUCC_CC0 = IUCC<0:1> = '00' * BRCH_MSK<0> *
CTL<0:3> = '1100'

-continued

BRHI_IUCC_CC1 = IUCC<0:1> = '01' * BRCH_MSK<1> * CTL<0:3> = '1100'

BRHI_IUCC_CC2 = IUCC<0:1> = '10' * BRCH_MSK<2> * CTL<0:3> = '1100'

BRHI_IUCC_CC3 = IUCC<0:1> = '11' * BRCH_MSK<3> * CTL<0:3> = '1100'

Thus, a central processor architecture implementing deterministic early condition code analysis using a digit based, subterm computation and selective subterm combination mechanism to substantially improve the instruction processing throughout of a central processing unit, particularly in the processing of conditional branch instructions, has been described.

Naturally, many modifications and variations of the present invention are possible in light of the above teachings. Specifically, the preferred embodiment of the present invention is equally capable of application to non-branch conditional instructions by treating the branch taken control signal as a decision signal indicating whether or not the execution of non-branch conditional instruction is to be modified or allowed to complete its normal execution. It is therefore to be understood that, within the scope of the appended claims, the invention may be practiced otherwise than as specifically described herein.

We claim:

1. Apparatus for executing processor instructions including a condition code setting instruction and a conditional instruction, the condition code setting instruction having associated data operands, each data operand including a plurality of data bits, said apparatus comprising:
   (a) means for the pipelined execution of processor instructions through a plurality of pipeline cycles including an instruction decode cycle and an instruction execution cycle, said pipelined execution means including means for decoding processor instruction to provide an identification control signal in response to the decode identification of a condition code setting instruction and a condition code mask in response to the decode identification of a conditional instruction; and
   (b) means for analyzing the operands associated with a condition code setting instruction during pipeline execution of concurrent instruction execution and instruction decode cycles of said condition code setting instruction and conditional instruction, respectively, the provide a condition code result upon conclusion of the instruction decode cycle of said conditional instruction, said analyzing means including means for concurrently generating a plurality of digit subterms of the operands associated with said condition code setting instruction and means, responsive to said identification control signal, for selectively combining said digit subterms and the conditions code mask provided in response to the decode of said conditional instruction to provide said condition code result, wherein each said digit subterm of each said data operand includes two or more data bits wherein the operands associated with said condition code setting instruction include upper and lower operands that each include a plurality of data digits and wherein said concurrently generating means generates upper and lower sets of said digit subterms from said upper and lower operands, respectively.

2. The apparatus of claim 1 wherein said selectively combining means comprises:
   (a) intermediate means for combining selected digit subterms of said upper set with one or more digit subterms of said lower set and selected digit subterms of said lower set with one or more digit subterms of said upper set to provide upper and lower condition decision subterms; and
   final means for combining said upper and lower condition decision subterms to provide said condition code result.

3. The apparatus of claim 2 wherein the processor instructions include an alternate condition code setting instruction and wherein said apparatus further includes means for generating a condition code during an instruction execution cycle in the pipeline execution of said alternate condition code setting instruction, and wherein said decoding means provides an alternate identification control signal and condition code mask in response to the decode identification of said alternate condition code setting instruction and wherein said selectively combining means, responsive to said alternate identification control signal, selectively combines the condition code mask provided in response to the decode of the said alternate condition code setting instruction to provide said condition code result.

4. A processor providing for the pipelined execution of processor instructions including respective pluralities of condition code setting instructions and condition code dependent instructions, wherein condition code setting instructions include first and second operands that respectively include a plurality of digits where each digit includes a plurality of data bits, wherein processor instructions are executed in a succession of processor cycles including an instruction decode cycle, one or more instruction execution cycles wherein a condition code may be determined, and a condition code setting cycle wherein a condition code determined in a prior execution cycle may be set in a condition code register, wherein condition code setting instructions requiring a single execution cycle for execution are early condition code setting instructions, and wherein the execution of a condition code dependent instruction requires a condition code result signal upon execution completion of its decode cycle, said processor comprising:
   (a) means for decoding a first processor instruction during the decode cycle in the execution of said first processor instruction, said decoding means providing a control signal identifying said first processor instruction, said decoding means further providing a condition code mask when said first processor instruction is a condition code dependent instruction;
   (b) means for executing a second processor instruction to determine a condition code, said condition code being determined during an execution cycle in the execution of said second processor instruction concurrent or subsequent to the decode cycle in the execution of said first instruction; and
   (c) analysis means for determining a condition code result signal based on said first and second operands of said second processor instruction, said analysis means including:

(i) first logic means for combining the digits of said first and second operands during the first execution cycle in the execution of said second processor instruction to simultaneously provide a plurality of digit based operand subterms, and (ii) second logic means for combining subsets of said plurality of digit based operand subterms to determine an early condition code result signal for each early condition code setting instruction of said plurality of condition code setting instructions during the first execution cycle in the execution of said second processor instruction.

(iii) third logic means for combining the condition code determined by said executing means with the condition code mask as provided by said decoding means when said first processor instruction is a condition code setting instruction to provide a normal condition code result signal, said analysis means selecting said condition code result signal from among said early condition code result signals and said normal condition code result signal in response to said control signal.

5. The processor of claim 4 wherein said analysis means includes means, responsive to said control signal, for storing an early condition code result signal determined by said second logic means, said analysis means selecting said condition code result signal from among said early condition code result signal stored by said storing means, said early condition code result signal and said normal condition code result signal in response to said control signal.

* * * * *